United States Patent [19]

Chen

[11] Patent Number: 4,950,872

[45] Date of Patent: Aug. 21, 1990

[54] CONTROL CIRCUIT FOR A SOURCE OF HEAT

[75] Inventor: Tung C. Chen, Villanova, Pa.

[73] Assignee: Therme, Inc., Wilmington, Del.

[21] Appl. No.: 394,752

[22] Filed: Aug. 16, 1989

[51] Int. Cl.$^5$ ............................................... H05B 1/02
[52] U.S. Cl. ................................... 219/499; 219/501; 219/508; 219/505; 219/494; 323/238; 323/265
[58] Field of Search ............... 219/494, 497, 499, 501, 219/505, 492, 507–510, 491; 307/117; 323/365, 366, 319, 235, 236, 238

[56] References Cited

U.S. PATENT DOCUMENTS

| | | | |
|---|---|---|---|
| 3,679,871 | 7/1972 | Evalds | 219/499 |
| 4,639,611 | 1/1987 | Sticher | 219/499 |
| 4,670,078 | 6/1987 | Thalmann et al. | 219/499 |
| 4,845,342 | 7/1989 | Chen | 219/494 |

*Primary Examiner*—M. H. Paschall
*Attorney, Agent, or Firm*—William E. Cleaver

[57] ABSTRACT

The present system includes a bridge circuit (with four legs) with one leg including a heating element. The mid-points of the bridge circuit are connected to a silicon controlled rectifier (SCR) which is further connected to the control element of a monostable multivibrator. Further connected to the power input elements of the monostable multivibrator is a D.C. power source. The monostable multivibrator is connected to a transistor which has a light emitting diode (LED) in its cathode circuit. The LED is part of a circuit which further includes a light sensitive triac. The light sensitive triac is further connected through a pulse generating circuit to the control element to a second triac which in turn is connected to supply heavy electrical current to the heating element. Accordingly, when the monostable multivibrator causes the transistor to conduct, the light sensitive triac conducts and fires the second triac and hence causes electrical current to pass to the heating element to generate heat at the heating element. Normally, the triacs would turn off at the zero crossover but the circuitry is arranged to have them in a conducting state into the next half cycle after the zero crossover. The present system includes a soft start feature, a short circuit proteciton feature and an electronic temperature selection control.

10 Claims, 1 Drawing Sheet

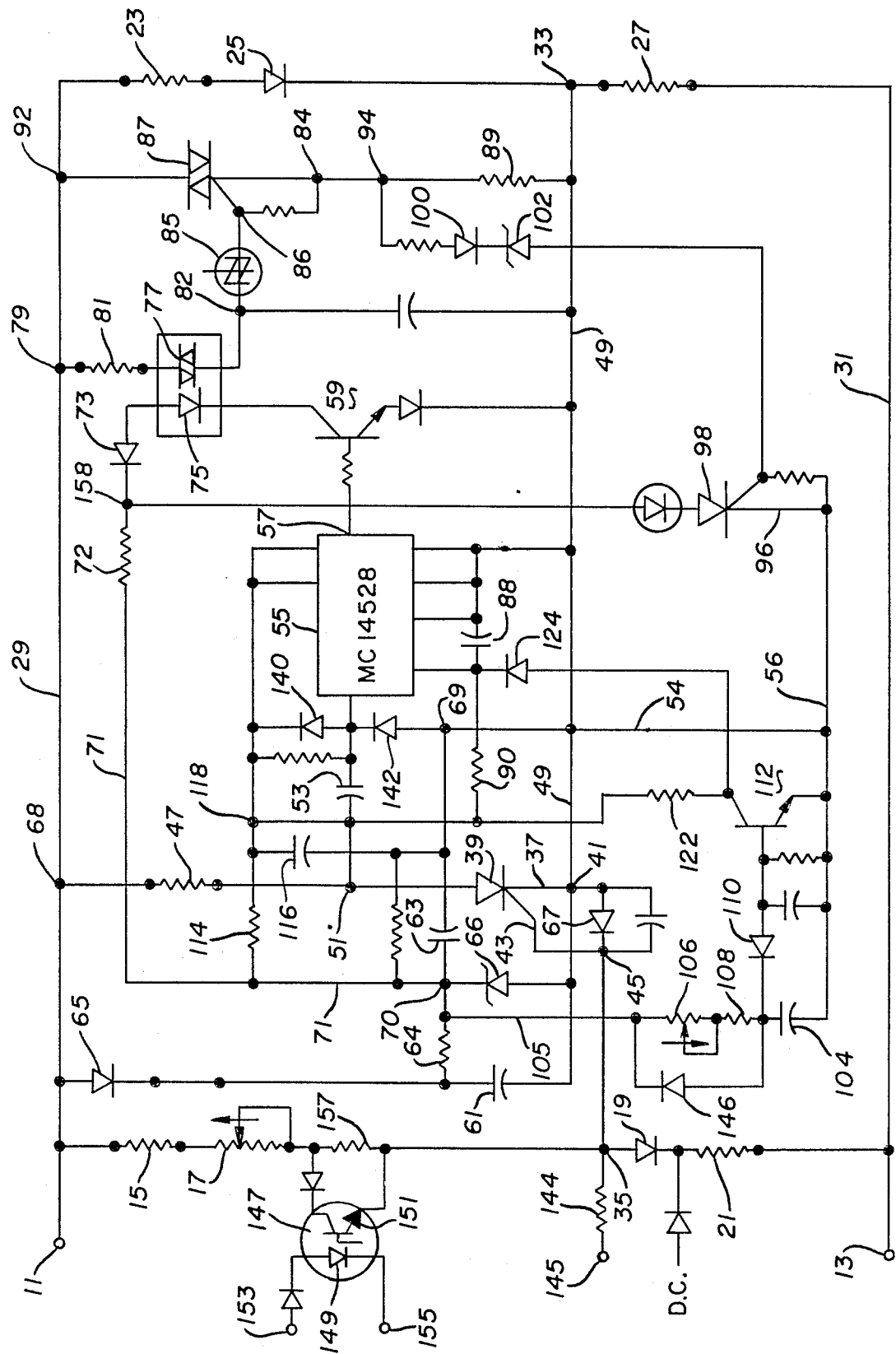

CONTROL CIRCUIT FOR A SOURCE OF HEAT

Background of the Disclosure

In prior art systems, which have been developed to provide heat by passing electrical energy through a heating element (i.e. through some form of an electrical resistor device), there has been an effort to: (1) provide heat at a relatively constant temperature for any given assignment, and (2) design circuits to have a fast response to demands for a change in temperature, with little heat inertia because heat inertia causes the system to overshoot the desired temperature. In the U.S. Pat. No. 3,679,871 as well as my U.S. Pat. No. 4,845,342, circuits are described which employ the source of heat (i.e. the heating element) as the temperature sensor. These last mentioned circuits, indeed, are capable of maintaining a relatively constant temperature for a given assignment and they each provide a means for a fast response to demands for changes in temperature. Each of the last two mentioned systems includes a bridge circuit. One leg of the bridge circuit (in each of the systems) acts in the role of the heating element and sensor. Accordingly, as the temperature of the heating element either increases or decreases, its electrical resistance value increases or decreases. The increases or decreases of resistance value, in turn, cause the voltage value at mid-point of the bridge, (to which the heating element is connected), to respectively increase or decrease. As the voltage value at the heating element mid-point increases or decreases, the error signal across the bridge responsively decreases or increases. The control signals (error signals) developed by the circuitry cause the heating element to be fed more or less electrical energy, which, in turn, maintains the heat at a relatively constant predetermined value.

The circuit of U.S. Pat. No. 3,679,871, and the circuit of U.S. Pat. No. 4,845,342 function quite well but each has drawbacks. The circuit of the '871 patent employs two silicon control rectifiers and each of these is subject to being burned out if the heating element experiences a short circuit. In addition, the circuit of the '871 patent does not include a soft start feature to provide for gradually warming up the heating element and such a feature is highly desirable. The circuit of the U.S. Pat. No. 4,845,342 includes a photoconductor-isolator (which is an LED connected in combination with a light sensitive resistor) to control a power triac. It has been determined that if in the manufacture of the photoconductor-isolator, the tolerances are not carefully maintained and monitored, then the response time to turn off the circuit is not desirable for some applications and is inconsistent. The present circuit provides for consistently high speed turnoffs, soft starts, short circuit protection, and an electronic arrangement for selecting a desired temperature.

Summary of the Disclosure

The present system has a bridge circuit (with four legs) connected across two input power lines. One of the legs includes a heating element. Since the electrical resistance of the heating element changes as it heats up, the heating element acts as a sensor for the system. An SCR is connected across the mid-points of the bridge and hence as the resistance value of the heating element changes, the error signal across the bridge changes. Initially the SCR is turned on and only becomes turned off when the error signal approaches zero. The SCR is connected at its anode to a monostable multivibrator so that when the SCR conducts it causes the monostable multivibrator to operate in its unstable state. The monostable multivibrator is further connected to the control element of a transistor so the transistor is turned on when the monostable multivibrator is its unstable state. The transistor is connected to an LED so that when the transistor conducts the LED is lighted. There is a light sensitive triac located in close proximity to the LED and said light sensitive triac is in a conducting state when the LED is lighted. The light sensitive triac is connected to a capacitor and a diac or bilateral switch. When the capacitor is charged to a predetermined value, it causes the triac to fire a pulse. The diac is further connected to the control element of a power triac and hence the power triac becomes conductive in response to the diac firing a pulse. The power triac is further connected to one power input line and shorter to the heating element, so that when the power triac is conducting electrical energy passes through the heating element (bi-directionally depending on the polarity of the electrical energy on the power line). If the heating element should develop a short circuit, then the present system provides a circuitry arrangement (which is connected to the power triac) to turn on a second SCR. Circuitry connected to a second SCR acts to cause the current which normally lights the LED to bypass the LED and hence the power triac turns off at the zero crossover and is not subjected to the heavy currents demanded by the short circuit condition of the heating element. The present system further has soft start circuitry which delays the time that the heating element is fully operating. In addition, the present system includes a circuit to enable the user to electronically select the desired temperature to which the heating element should be raised. By employing the monostable multivibrator, the present system eliminates the need for careful manufacturing tolerances of the control circuit of the power triac which enables the user to be ensured of a good response time while not needing to carefully test each photoconductor isolator as has been true in the prior art.

The objects and features of the present invention will become more apparent in view of the description to follow which is made in conjunction with the drawing. The drawing is a block diagram schematic of the inventive circuit.

Examine the drawing. In the drawing there is shown two input power terminals 11 and 13. Terminal 11 goes to the power lines 29 while the terminal 13 is connected to the power line 31. Connected across the power lines 29 and 31 is a bridge having four legs. The first leg is made up of the resistor 15 which is connected to adjustable resistor (pot) 17 which is connected to a mid-terminal 35. The second leg of the bridge starts with the mid-terminal 35 and includes diode 19 as well as resistor 21 which is connected to the other power line 31. The third leg of the bridge is comprised of the resistor 23 which is connected to line 29 and which is series connected to diode 25. The diode 25 is connected to the second mid-terminal 33. The fourth leg of the bridge is the heating element 27 which is connected between the mid-terminal 33 and the other power line 31. The whole purpose of the circuit shown in the drawing is to heat up something (for example an oil pipe line), whatever it might be, by virtue of passing electrical current through the resistor 27 and thereby generating heat.

As is well understood in the concept of bridge circuits, there is an error signal developed between the mid-terminal 33 and the mid-terminal 35. As can be seen in the drawing, the mid-terminal 33 is connected to the cathode 37 of the silicon control rectifier (SCR) 39. As also can be gleaned from the drawing, the gate 43 of the SCR 39 is connected to the mid-terminal 35. When power is first applied to the terminal 11 and 13, current flows across the first leg and through the second leg to the power line 31. Current also flows across the third leg and across the heating element 27 to the power line 31. However, the resistance value of 23 is sufficiently high that very little current passes through the third and the fourth legs and hence the heating element 27 is producing only a small amount of heat, i.e. far less than the system requires. At the same time, initially, current flows from the line 29 through the diode 65 and charges the capacitor 61 as well as the capacitor 63. The current flow, which enables the capacitor 61 to be charged is through capacitor 61, along line 49 to the mid-terminal 33 and through the heating element 27. While at the same time there is also current flow through the resistor 64, through the capacitor 63, to the point 69 down to the line 49, across to the right to the terminal 33, and through the heating element 27. While there will be some current flow from point 41 through the diode 67 to the other mid-terminal 35, that is a lesser amount of current because of the resistor 21.

As can be further seen from an examination of the drawing, there is an attempt to pass current from point 79 through the light sensitive triac 77, but the light sensitive triac has not been turned on, and accordingly no current flows therethrough. There is also an attempt to pass current from the point 92, through the triac 87, but since the triac 87 has not been turned on, no current will flow therethrough. Finally, there is an attempt to pass current from the point 68, through resistor 47, through the silicon control rectifier 39, to the point 41 and therefrom along the line 49, through the mid-terminal 33 and resistor 27. If the silicon control rectifier 39 is turned on current flow will take place. Since, initially, the mid-terminal 33 has very little current flowing therethrough and therefrom across the resistor 27, it is at a lower voltage value than is the mid-terminal 35 and hence the SCR 39 is turned on and conducts. With the SCR 39 conducting, the terminal 51 will experience a negative voltage excursion which will be passed, as a pulse, through the capacitor 53 to turn the monostable multivibrator 55 into its unstable state. When the monostable multivibrator 55 is in its unstable state a positive voltage appears at its output terminal 57, and hence the transistor 59 conducts. Now as will be explained in more detail hereinafter, the monostable multivibrator 55 is designed to be in its unstable state until the positive half cycle of the a.c. power, applied to 11 and 13, has transpired and until part of the negative half cycle has taken place. Accordingly the power triac 89 conducts for the negative half cycle because the monostable multivibrator 55 is in its unstable state for part of the negative half of the power cycle. However, initially it is desirous to heat up the heating element 27 in stages without causing a tremendous surge of current thereto from the beginning of the power application. As was mentioned earlier, the present system has a soft start, or a delay of the heavy currents into the heating element 27. The manner in which the soft start is accomplished is by delaying the firing of the transistor 112 until sufficient time has passed to "heat up" the heating element 27.

Note that when the power is first applied to the terminals 11 and 13 and current does flow through the diode 65, across the resistor 64, such current also passes along the line 105, through the variable resistor 106 and across the resistor 108 to charge up the capacitor 104. Since the unstable period of time, (that is the time that the monostable multivibrator 55 is in its unstable state), is in fact controlled by the RC values of the resistor 90 and the capacitor 88, those values must be effectively adjusted in order to shorten the unstable period and thus permit the stable state to finish up within the positive half of the cycle. Note that the resistor 90 is connected in parallel with the resistor 122 through the diode 124. Accordingly, as long as the transistor 112 is not conducting, the RC value for the monostable multivibrator will have a lesser R value than if the resistor 122 were not connected in parallel to the resistor 90. With resistor 122 being effective the stable state of the monostable multivibrator 85 will finish within the positive half of the power cycle. When the system first starts up, the transistor 112 is not conducting and hence the resistor 122 does play the parallel role with the resistor 90. When the capacitor 104 has been charged to a predetermined value, it fires across the zener diode 110 and causes the transistor 112 to conduct. When the transistor 112 does conduct, the resistor 122 and the diode 124 are simply taken out of the circuit. Since resistor 122 is ineffective, the RC value for the monostable multivibrator is made up of the value of the resistor 90 and the value of the capacitor 88. As was mentioned earlier, those two values enable the monostable multivibrator to stay in its unstable state part way into the negative half cycle. The delay for the soft start (warm up) is controlled by the size of the capacitor 104. During the soft start, the triac 87 does not conduct in the negative half of the cycle and thus the current to the load 27 is reduced.

Consider now that we have gone through the soft start, or the warm up, and the system is going to go into normal operation. Consider the positive half of the cycle only. As long as the heating element 27 has not heated up to its desired temperature, then the voltage at point 33 will be lower than the voltage at point 35 and the SCR 39 will be conducting. During the positive half cycle, the point 51 experiences a negative excursion which as mentioned earlier provides a pulse through the capacitor 53 to turn on the monostable multivibrator 55. When the monostable multivibrator 55 is turned on, it provides a positive voltage at the control element 57 and thus transistor 59 is placed into a conducting stage. However, there has to be a supply of DC power applied to the cathode of the transistor 59. That DC supply is developed at point 70. When the capacitor 61 and the capacitor 63 are charged up to a predetermined value, these charged capacitors, in conjunction with the zener diode 66, provide a regulated DC voltage at point 70. The regulated DC voltage at point 70 is supplied by virtue of line 71, across the resistor 72, across the zener diode 73, to the LED 75. Since the transistor 59 is in a conducting mode there will be current flowing from the point 70, through the LED 75, and across the transistor 59. Accordingly, the LED 75 will be lighted. When LED 75 lights, it causes the light sensitive triac 77 to be conductive. It will be recalled that at this time, we are in the positive half of the cycle, hence there will be current flow from the point 79, through the resistor 81, through the light sensitive triac 77, through the capacitor 83 to the mid-terminal 33, and therefrom through the heating element 27. The foregoing current flow will cause the capacitor 83 to be charged up and when it reaches a predetermined value will cause the diac 85 to transmit a pulse to the gate element of the power triac 87. The pulse from the diac 85 will cause the power triac 87 to be turned on and hence there will be heavy current flow from the point 92, through the triac 87, across the resistor 89 to the mid-terminal 33 and therefrom through the heating element 27 to cause the heating element to be heated up.

When the negative power half cycle is applied to the terminal 11 and 13, there will no current flow through the diode 65 as the line 29 is negative and for the same reason there will be no current flow through the SCR 39. Accordingly, there will be no negative excursion of the voltage at point 51. However, it will be recalled that the RC values of 90 and 88 keep the monostable multivibrator 55 in its unstable state while the power cycle goes beyond the zero crossover so that even though there is no negative excursion at point 51, nonetheless the transistor 59 is still in a conducting mode. Since the transistor 59 is in the conducting mode and since there is a regulated DC voltage at point 70, the LED 75 continues to be lighted and hence the light sensitive triac 77 is in a conducting mode through the zero crossover. Bear in mind that we are considering, (at this point in the discussion) the negative half of the power cycle so that there is a positive potential on line 31 and a negative potential on line 29. Accordingly, there is current flow through the heating element 27, through the mid-terminal 33, through the capacitor 83, through the light sensitive triac 77, to line 29. Under these circumstances, the capacitor 83 will be charged in the opposite direction (than was the case during the positive half of the cycle) and this will cause the bilateral switch 85 to provide a negative pulse to the gate of the power triac 87. Hence, the power triac 87 will conduct in the opposite direction. Current from line 31 will pass through the heating element 27 to the mid-terminal 33, through the resistor 89, through the power triac 87, to terminal 92. Thus during the negative half of the power cycle, the heating element 27 will be subject to full electrical energy and full heating experience.

A number of the circuit elements connected to the monostable multivibrator 55, are employed to keep the monostable multivibrator from misfiring or acting in some undesirable way. For instance, the resistor 114 and the capacitor 116 act as a filter or integrator so that the voltage at point 118 remains fairly constant. By filtering the signal to point 118, any noise developed in the system will not cause the monostable multivibrator to stay in one state, or the other, longer than it should. The two diodes 140 and 142 act as clamps so that the voltage at the control element of the monostable multivibrator 55 always remains between the voltage developed at point 70 and the voltage developed at If for some reason the heating element 27 develops a short circuit or is involved in a short circuit episode, then during the half cycle in which the short circuit occurs, there would be a tremendous surge of electrical current across the resistor 89. Such a current surge would cause a large voltage value to appear at the point 94. As can be seen in the drawing, the point 94 is connected through diodes 100 and 102 to the gate element of the SCR 98. The rise in voltage at the point 94 would cause SCR 98 to be turned on and hence there would be current flow from capacitor 61, along the line 71, through the resistor 72, through the SCR 98, over the line 56 and upward along the line 54, to the line 49, to point 41 and therefrom to the other side of capacitor 61. Accordingly LED 75 is turned off and no triggering is produced to turn on the power triac 87. SCR 98 remains conducting until the power is turned off. Hence the SCR 98 acts as a short circuit protective device and operates within the half cycle that the short circuit occurs.

In the drawing it can further be seen that there is a resistor 144 and AC input terminal 145. If the user wants to change the desired value of the temperature to which the heating element 27 should be heated, this can be done by changing the "pot" setting of the variable transistor 17 or can be effected by merely applying a signal to the terminal 145. A signal to terminal 145 will be additive and therefore cause the error signal between the mid-points 35 and 33 to be greater than was in effect before the signal was applied. With a greater error signal, the heating element 27 will have to heat up to a higher temperature in order to make the error signal become zero. The signal applied to the terminal 145 is an AC signal. It is conceivable that it would be desirable to control the desired temperature by a DC signal. Accordingly, there is provided a photo-isolator circuit 147. The photoisolator circuit 147 has an LED 149 as well as a light sensitive transistor 151. When a DC signal is applied to the terminals 153 and 155, the LED 149 is lighted and hence the transistor 151 conducts. When transistor 151 conducts, it, of course, shunts the resistor 157 and thereby changes the voltage value at mid-terminal 35 so that the heating element 27 is required to get warmer, or has to change resistance value to a greater degree to develop an error signal across the mid-terminals 33 and 35.

I claim:

1. A circuit for controlling electrical energy which is transmitted to heatable means, comprising in combination:

first and second input lines, respectively connected to first and second terminals of an electrical power source and arranged with respect to said electrical power source such that when said first input line experiences a relatively positive electrical potential, said second input line experiences a relatively negative electrical potential and alternatively when said first input line experiences a relatively negative electrical potential said second input line experiences a relatively positive electrical potential;

bridge circuit means comprising first, second, third and fourth legs with said fourth leg including said heatable means, said bridge circuit means further formed to have both a first mid-terminal disposed between said first and second legs and a second mid-terminal disposed between said third and fourth legs, said bridge circuit connected across said first and second input line;

first switching circuit means formed to be in a conducting state and alternatively in a non-conducting state and connected to said first input line and to said first and second mid-terminals and formed so that the difference between the voltage values respectively at said first and second mid-terminals will determine whether said first switching means will be rendered conducting or non-conducting;

second switching means formed to operate in a stable state and alternatively in an unstable state, said second switching means connected to said first switching means whereby when said first switching means conducts said second switching means will be transferred to operate in its unstable state;

third switching means formed to be in a conducting state and alternatively a non-conducting state and formed to have a control means, said control means being connected to said second switching means whereby when said second switching means is operating in its unstable state said third switching means is rendered conducting;

first bidirectional current means connected to said first input line and connected to said third switching means whereby when said third switching means conduct said first bidirectional current conducting means conducts current therethrough;

second bidirectional current conducting means connected to said first input line and connected to said first bidirectional current conducting means and connected to said second mid-terminal whereby when said first bidirectional current conducting means conducts said second bidirectional current conducting means will conduct relatively heavy current for further conduction through said heating means.

2. A circuit according to claim 1 wherein said first switching circuit means is a silicon controlled rectifier whose anode terminal is connected to said second mid-terminal and whose gate terminal is connected to said first mid-terminal.

3. A circuit according to claim 2 wherein there is a resistor connected between the cathode of said silicon controlled rectifier and said first input line and wherein said second switching means is a monostable multivibrator whose control element is connected between said last mentioned resistor and the cathode of said silicon controlled rectifier.

4. A circuit according to claim 3 wherein said monostable multivibrator is formed to be in its unstable state in accordance with the resistance value and the capacitance value of an RC circuit formed with said monostable multivibrator.

5. A circuit according to claim 4 wherein said third switching means comprises a transistor whose base element is connected to an output element of said monostable multivibrator whereby said transistor is rendered conductive when said monostable multivibrator is in its unstable state.

6. A circuit according to claim 1 where there is further included a capacitor resistor circuit arrangement to provide the regulated DC voltage supply and wherein said regulated DC voltage supply is connected to provide power to said second switching means.

7. A circuit according to claim 6 wherein said regulated DC voltage supply is further connected to the supply DC power to said third switching means.

8. A circuit according to claim 1 wherein said first bidirectional current conducting means comprises a light emitting diode and a light sensitive triac.

9. A circuit according to claim 1 wherein said second switching means is formed to remain in its unstable state until the negative half cycle of the power applied to the first and second input lines has commenced.

10. A circuit according to claim 1 wherein there is further included short circuit protection means connected to said second bidirectional current conducting means and formed such that in the event said heating element experiences a short circuit and heavy current tends to flow through said second bidirectional current conducting means, said short circuit protection circuitry will cause said heavy current to bypass said second bidirectional current conducting means.

* * * * *